United States Patent [19]
Babu

[11] Patent Number: 5,192,616
[45] Date of Patent: Mar. 9, 1993

[54] MACROMOLECULAR MONOMERS FROM LIVING POLYMERS

[75] Inventor: Gaddam N. Babu, Woodbury, Minn.

[73] Assignee: Minnesota Mining and Manufacturing Company, St. Paul, Minn.

[21] Appl. No.: 775,684

[22] Filed: Oct. 10, 1991

Related U.S. Application Data

[62] Division of Ser. No. 614,307, Nov. 15, 1990, Pat. No. 5,104,952.

[51] Int. Cl.$^5$ ............ B32B 27/08; C08F 30/08; C08F 236/20
[52] U.S. Cl. .................. 428/407; 525/191; 525/193; 525/195; 525/196; 525/242; 525/248; 525/250; 525/276; 525/271; 525/286; 525/288; 525/292; 525/340; 526/173; 526/240; 526/242; 526/346; 526/279
[58] Field of Search ............... 526/279; 525/292, 286, 525/288, 276, 191, 193; 428/407

[56] References Cited

U.S. PATENT DOCUMENTS

| | | | |
|---|---|---|---|
| 3,029,221 | 4/1962 | Welch | 525/227 |
| 3,786,116 | 1/1974 | Milkovich et al. | 260/885 |
| 3,832,423 | 8/1974 | Milkovich et al. | 260/878 R |
| 3,842,057 | 10/1974 | Milkovich et al. | 260/93.5 A |
| 3,842,058 | 10/1974 | Milkovich et al. | 260/93.5 A |
| 3,842,059 | 10/1974 | Milkovich et al. | 260/93.5 A |
| 3,842,146 | 10/1974 | Milkovich et al. | 260/879 |
| 3,862,267 | 1/1975 | Milkovich et al. | 260/878 R |
| 4,080,400 | 3/1978 | Martin | 260/825 |
| 4,148,838 | 4/1979 | Martin | 260/825 |
| 4,273,896 | 6/1981 | Martin | 525/271 |
| 4,327,201 | 4/1982 | Kennedy et al. | 526/131 |
| 4,857,615 | 8/1989 | Bronn et al. | 526/173 |
| 4,857,618 | 8/1989 | Silver et al. | 526/240 |

OTHER PUBLICATIONS

Makromolekulare Chemie, vol. 69, 1963, pp. 193-205 (English language abstract enclosed) Chemical Abstracts, vol. 107, No. 20, Nov. 16, 1987.
R. Backskai, J. Pol. Sci.: Parta, 3, 2491 (1965).
Assignee's copending application Ser. No. 07/403,662, now allowed.

Primary Examiner—Joseph L. Schofer
Assistant Examiner—Fred Zitomer
Attorney, Agent, or Firm—Gary L. Griswold; Walter N. Kirn; Sherman Lorraine R.

[57] ABSTRACT

A new class of macromolecular monomers (hereinafter called "macromonomers") comprises the polymerized product of at least one of an ethenylarene and a conjugated diene monomer, the product having a terminal omega-alkenyl group of at least four carbon atoms. The novel macromonomer can be copolymerized with ethylene and alpha-olefin monomers to form graft copolymers having pendant side-chains. The graft copolymers are useful as coating and molding compositions. The macromonomers can be useful as coatings on chromatographic supports for analytical and preparative separation of chemical mixtures.

9 Claims, 2 Drawing Sheets

MACROMOLECULAR MONOMERS FROM LIVING POLYMERS

This is a division of application Ser. No. 07/614,307 filed Nov. 15, 1990 now U.S. Pat. No. 5,104,952.

TECHNICAL FIELD

The present invention provides a new class of macromolecular monomers (hereinafter called "macromonomers") comprising the polymerized product of at least one of an ethenylarene and a conjugated diene monomer, the product having a terminal omega-alkenyl group of at least four carbon atoms. In another aspect, the novel macromonomer can be copolymerized with ethylene and alpha-olefin monomers to form graft copolymers having pendant side chains. The graft copolymers are useful as coating and molding compositions. The macromonomers can be useful as coatings on chromatographic supports for analytical and preparative separation of chemical mixtures.

BACKGROUND OF THE INVENTION

Much attention has been devoted recently to the synthesis, characterization, and reactivity of well-defined macromonomers of various kinds. This interest in macromonomers stems from their utility as intermediates in the preparation of graft copolymers. These copolymers have many potential applications in areas of coatings and molding compositions.

Certain prior art macromonomers are capable of copolymerization with ethylene and lower alpha-olefins such as propylene.

A variety of methods for preparing certain classes of styrene, substituted styrene, butadiene, and substituted butadiene macromonomers are known in the art.

Patents of Milkovich (U.S. Pat. Nos. 3,786,116, 3,832,423, 3,842,059, and 3,862,267) teach how to make certain classes of vinyl terminated polystyrene and polybutadiene macromonomers and how to use these macromonomers to form copolymers with other ethylenically unsaturated monomers.

In teaching how to make his macromonomers, Milkovich discloses (U.S. Pat. No. 3,842,059 column 11, line 30 through column 15, line 17) that "living" anions formed in anionically catalyzed polymerization processes can be reacted with a "terminating" agent to yield the macromonomer. The terminating agent is difunctional. One of the functional groups reacts with and terminates the living anion. The other functional group is a vinyl group capable of reacting with other ethylenically unsaturated monomers in subsequent graft copolymerizations. While Milkovich acknowledges the possibility of "certain deleterious side reactions" and proposes the use of "capping" agents to minimize such reactions (U.S. Pat. No. 3,842,059 column 13, line 47 through column 14, line 12), he fails to recognize that the vinyl group in some of his terminating agents are also capable of anionic polymerization. In these cases, branching reactions can take place during the termination reaction which broaden the molecular weight distribution and increase the polydispersity of the macromonomer and can result in loss of reactive sites. Such branching reactions are disclosed by Bronn et al. (U.S. Pat. No. 4,857,615), Silver et al. (U.S. Pat. No. 4,857,618), and Martin (U.S. Pat. Nos. 4,080,400, 4,148,838, and 4,273,896). The vinyl groups of Milkovich terminating agents [U.S. Pat. No. 3,842,059, column 12, terminating agents (h), (i), and (j)] are capable of anionic polymerization during termination and thus are capable of producing branched macromonomers with increased polydispersities.

In teaching how to use his macromonomers, Milkovich discloses (U.S. Pat. No. 3,842,059, column 4, lines 44 through column 5, line 3, and column 21, lines 1-41) that his macromonomers can be polymerized using free-radical, anionic, cationic, condensation, and coordination catalysts. He further discloses that ZN catalysts can be used to copolymerize $C_2$ to $C_{18}$ alpha-olefins with other ethylenically unsaturated monomers (U.S. Pat. No. 3,832,423, column 3, lines 58-68; U.S. Pat. No. 3,842,059, column 18, lines 28-35; and U.S. Pat. No. 3,862,267, column 4, lines 43-53). However, Milkovich only exemplifies Ziegler-Natta (ZN) graft copolymerization of macromonomers with alpha-olefins below $C_4$.

The prior art macromonomers of Milkovich which polymerize under free radical conditions to form copolymers with, for example, acrylate monomers, are unreactive in ZN graft copolymerizations.

Graft copolymers derived from cationically polymerizable isobutylene-derived macromonomers are described in U.S. Pat. No. 4,327,201. The patentees' disclosure of ZN polymerizable monomers is limited to olefins of four carbon atoms or less in the repeat unit.

SUMMARY OF THE INVENTION

Briefly, the present invention provides a macromolecular monomer comprising the polymerized product of at least one of an ethenylarene and a conjugated diene monomer, the product having a terminal omega-alkenyl group of at least four carbon atoms. The macromolecular monomer is synthesized by anionic living polymer techniques. The novel macromonomers of the invention are random, block, or tapered block polymers, have number average molecular weight from about 2,000 to about 30,000, and a broad range of glass transition temperatures. They include linear, branched, and star macromonomers and are unique in that they readily copolymerize with alpha-olefins in the presence of ZN coordination catalysts in addition to other copolymerizable ethylenically-unsaturated monomers. Unlike macromonomers of the prior art, the alkenyl group-containing macromonomers of the present invention have at least two methylene spacing groups separating the vinyl group of the alkenyl group from the remaining portion of the polymer. Such separation allows facile copolymerization under ZN conditions of macromonomers containing polar groups, i.e.,

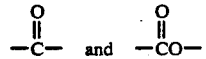

groups, with alpha-olefins when the polar group is complexed with a Lewis acid. In the absence of such separation, the copolymerization does not take place even in the presence of the Lewis acid complex.

In another aspect, two methods, I and II, are disclosed for providing the macromonomers of the invention. By method I, the macromonomer is made by anionically polymerizing at least one of ethenylarene and conjugated diene monomers to form a living polymer and terminating the living anion with a terminating agent having multiple functionality, e.g. an omega-alkenyl group and one or more group(s) capable of undergoing nucleophilic displacement reactions. Useful terminating agents include omega-alkenyl acid halides which react to form macromonomers containing carbonyl linking groups (as shown in Summary Reactions I below) and omega-alkenyl mono-, di-, and tri-, halosilanes whose highly reactive silicon-halogen bond allows controlled preparation of linear, branched, and star macromonomers having narrow molecular weight distributions (as shown in Summary Reactions II below).

By method II, the macromonomer is prepared directly by reacting an initiator containing omega-alkenyl groups with at least one of anionically polymerizable ethenylarene and/or conjugated diene based monomers to form a living polymer and terminating the living anion by reaction with alcohol as is well known in the art. The polymerization and termination reactions are summarized in Summary Reactions III, below.

During termination, one living polymer anion is terminated in each nucleophilic displacement reaction. Unlike prior art polar macromonomers, the macromonomers used in the present invention are compatible with anionic polymerization processes; i.e. the omega-alkenyl group is not capable of re-initiating anionic polymerization of itself or other polymerizable monomers because the methylene spacing groups disrupt resonance effects that activate the vinyl group of prior art terminating agents to further anionic polymerization. This eliminates branching side reactions that broaden the molecular weight distribution and caused the loss of reactive sites in prior art macromonomers. If a less reactive anion is desired, the living polymer anion can be converted to an alkoxy anion by the addition of ethylene oxide or substituted ethylene oxide prior to reaction with the terminating agent (as shown in Summary Reactions I and II below).

In a further aspect, the present invention provides graft copolymers of the macromonomers of the invention with α-olefins. Weight average molecular weights of the novel copolymers can be in the range from 50,000 to 10 million, preferably from 100,000 to 5 million, most preferably from 250,000 to 4 million.

In a still further aspect, the present invention provides a method for making graft copolymers using coordination catalysts of the Ziegler-Natta (ZN) type. The method involves reacting the inventive macromonomers with one or more α-olefins, in an anhydrous, inert organic solvent in the presence of a ZN catalyst to provide a copolymer.

In this application:

the terminology and nomenclature relating to the macromonomers and graft copolymers of the invention is that used by L. H. Sperling, "Introduction to Physical Polymer Science", John Wiley, NY, 1986, pp. 39–47, pp. 111-116,,and pp. 279-280 which are hereby incorporated by reference;

"living polymer" means a polymer prepared by anionic polymerization that in the absence of impurities has no formal termination reaction, i.e., there is no termination or transfer reaction. (Cowie, "Polymers: Chemistry and Physics of Modern Materials", Intext Ed. Pub., NY, 1973, p 82-3);

"at least one of an ethenylarene and conjugated diene polymer" means a living polymer having repeating units from either or both ethenylarene (i.e., a vinyl substituted aromatic hydrocarbon) and conjugated dienes;

"Ziegler-Natta (ZN) catalyst" means a two-component coordination initiator or catalyst having the properties described by Seymour and Carraher, "Polymer Chemistry," Marcel Dekker, Inc., N.Y. (1988), p. 296;

"linear omega-alkenyl group" means a group having the following formula: $-C_nH_{2n}-CH_2CH_2-CH=CH_2$ where n is 0 to 16;

"alpha olefin" means any vinyl-containing aliphatic monomer, and in this application includes ethylene;

"macromonomer" means a polymer having a number average molecular weight ranging from several hundred to tens of thousands, with a functional group $-CH_2CH_2-CH=CH_2$; and "oxyhydrocarbon" means a group contains hydrogen, carbon, and ether oxygen atoms.

Assignee's copending patent application, U.S. Ser. No. 07/403,662, now U.S. Pat. No. 5,112,882 filed the same date as this application, discloses a class of graft copolymers which are useful in pressure sensitive adhesive compositions.

There is no prior art of which the inventors are aware that discloses ZN copolymerization of macromonomers having functional groups containing heteroatoms with ethylene or higher α-olefins.

DESCRIPTION OF PREFERRED EMBODIMENTS

Figure 1:
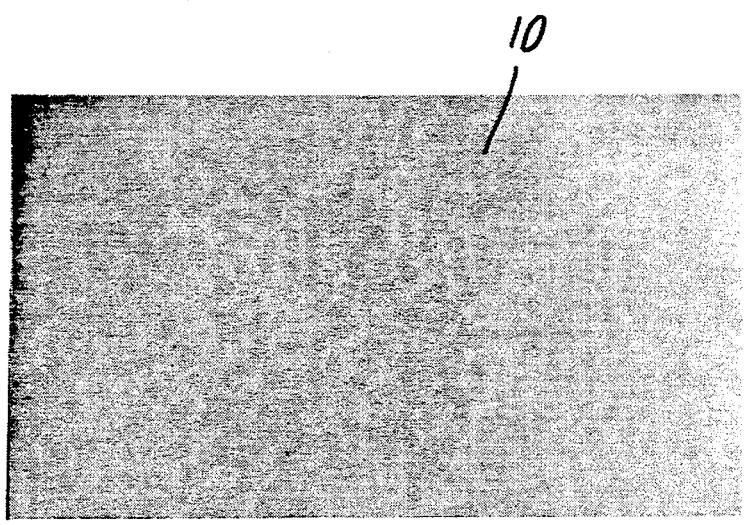
FIGS 1, 2 and 3 show electron photomicrographs of copolymers of the invention, magnification 100,000×.

The macromonomers of the invention can be represented by the general formulae:

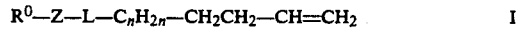

$$R^0-Z-L-C_nH_{2n}-CH_2CH_2-CH=CH_2 \qquad I$$

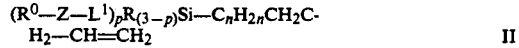

$$(R^0-Z-L^1)_pR_{(3-p)}Si-C_nH_{2n}CH_2CH_2-CH=CH_2 \qquad II$$

wherein

R is a saturated or unsaturated, linear hydrocarbyl group having 2 to 20 carbon atoms, a branched hydrocarbyl group having 3 to 20 carbon atoms, or a cyclic hydrocarbyl group having 5 to 20 carbon atoms;

n is an integer having a value from 0 to 16 preferably from 0 to 4, p is an integer having a value of 1, 2, or 3, each R is independently a monovalent hydrocarbyl group which is selected from alkyl groups having from 1 to 18 carbon atoms, aryl groups having from 6 to 10 carbon atoms, and cyclic hydrocarbyl groups having from 5 to 10 carbon atoms, preferably, R is methyl or ethyl;

L is a divalent-linking group selected from the group consisting of

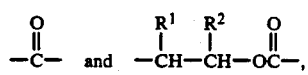

in which each $R^1$ and $R^2$ is independently hydrogen, a $C_1$ to $C_4$ alkyl group, phenyl group, or both of $R^1$ and $R^2$ together with the carbon atoms to which they are attached form a ring having 5 or 6 carbon atoms; and $L^1$ is a covalent bond or a divalent linking group

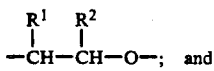

Z is a divalent polymeric group derived from either or both of polymerizable ethenylarene and conjugated diene monomers.

More particularly, Z is a divalent polymeric group obtained from the anionic polymerization of one or both of 1) one or more ethenylarene monomers having 8 to 20 carbon atoms, and 2) one or more conjugated diene monomers having 4 to 20 carbon atoms.

The divalent polymeric group Z can be a homopolymeric group made solely from ethenylarene monomers, or solely from conjugated diene monomers. The polymer can also be a copolymer formed from both ethenylarene and conjugated diene monomers. The copolymer can be a random copolymer, a block copolymer, or a tapered block copolymer. When Z is a block polymeric group, it can be monoblock, di-block or higher. Preferably, Z has a number average molecular weight in the range of 1500 to 30,000, more preferably 2,000 to 30,000, and a polydispersity in the range of 1.05 to 5.0, preferably in the range of 1.05 to 3.0.

In preferred embodiments, the divalent polymeric Z group has the general formula:

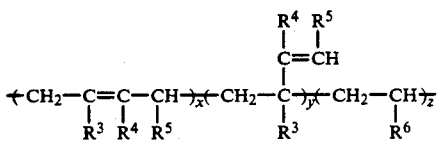

wherein each of $R^3$, $R^4$, and $R^5$ is independently, hydrogen, phenyl, an alkyl or alkenyl group having 1 to 12 carbon atoms [there being no more than 16 carbon atoms total in ($R^3 + R^4 + R^5$)] or any two of $R^3$, $R^4$, and $R^5$ together with the carbon atoms to which they are attached form one or two saturated or unsaturated 5 or 6 carbon atom rings, preferably each of $R^3$, $R^4$, and $R^5$ is hydrogen or methyl;

$R^6$ is an aryl group having 6 to 18 carbon atoms, optionally substituted by lower alkyl groups having from 1 to 4 carbon atoms, trialkylsilyl, 2,2-dialkylalkoxysilyl, N,N-bis(trimethylsilyl)amino, trimethylsiloxyethyl, and 1,1-dimethylethoxycarbonyl groups; and x, y and z are numbers, each having a value in the range of 0 to 300, provided that the sum of x, y, and z is in the range of 10 to 300.

The anionic polymerization methods used to make the Z group (the polymeric portion of the macromonomer which can be obtained by anionic polymerization of at least one of ethenylarenes and conjugated dienes) are well known to those skilled in the polymer art. Such methods are discussed by G. Odian in "Principles of Polymerization", Wiley-Interscience, (1981), pp. 372–409. For example, the Z group can be conveniently prepared by polymerizing at least one of ethenylarenes and conjugated diene monomers by the use of an alkali metal hydrocarbyl or alkoxide salt in an inert organic solvent such as a hydrocarbon or ether which does not participate in, or interfere with, the polymerization process.

Any conjugated diene having 4 to about 20 carbon atoms capable of polymerization by anionic methods can be used in the preparation of the polymeric Z group. Examples of linear and branched conjugated dienes include: 1,3-butadiene, 1,3-pentadiene, 1,3-hexadiene, 1,3-heptadiene, 2-methyl-1,3-butadiene (isoprene), 2,3-dimethyl-1,3 butadiene, 2,3-diethyl-1,3-butadiene, 2,5-dimethyl-1,3-hexadiene, 2-phenyl-1,3-butadiene, 2,3-diphenyl-1,3-butadiene, 2-methyl-6-methylene-2,7-octadiene (myrcene), and the like. Examples of cyclic conjugated dienes include: 1,2-bis(methylene)cyclopentane, 1,2-bis(methylene)cyclohexane, 3-methylenecyclohexene, 1-ethenylcyclohexene, 1-ethenylcyclopentene, 2,3-bis(methylene)bicyclo[2.2.1]heptane, and the like.

Any ethenylarene having 8 to about 20 carbon atoms that can be polymerized by anionic polymerization methods can be used in the preparation of the divalent Z group. Examples include: styrene (ethenylbenzene), α-methylstyrene ((1-methylethenyl)benzene), 1-ethenyl-2-methylbenzene, 1-ethenyl-3-methylbenzene, 1-ethenyl-4-methylbenzene, 1-ethenyl-4-(1,1-dimethylethyl)benzene, 4-dodecyl-1 ethenylbenzene, 1-ethenylnaphthalene, 2-ethenylanthracene, 10-ethenylanthracene, 1-ethenylfluorene, 2-ethenylphenanthrene, 1-ethenylpyrene, and the like. Examples of ethenylarenes substituted by groups that provide elevated glass temperatures to the macromoners of the invention and are unreactive under anionic polymerization conditions are: 1-ethenyl-4-methylbenzene, 1-ethenyl-4-ethylbenzene, 1-ethenyl-4-t-butylbenzene, 1-ethenyl-4-(trimethylsilyl)benzene, 1-ethenyl-4-(dimethyl-1-methylethoxysilyl)benzene, 1-ethenyl-4-[N,N-bis(trimethylsilyl)amino]benzene, 1-ethenyl-4-[(1,1-dimethyl)ethoxycarbonyl]benzene, and the like.

Initiators for anionic polymerization may be any of the alkali metal hydrocarbyl salts which produce a monofunctional living polymer, i.e., only one end of the polymer contains a reactive ion. Such initiators include organometallic hydrocarbon salts of lithium, sodium, or potassium, for example, having an alkyl or alkenyl radical containing up to 20 carbon atoms or more, and preferably up to 8 carbon atoms. Illustrative alkali metal organometallic initiators include ethylsodium, propylsodium, phenylsodium, ethyllithium, propyllithium, n-butyllithium, i-butyllithium, tert-butyllithium, 3-butenyllithium, 4-pentenyllithium, 5-hexenyllithium, 7-octenyllithium, sodium methoxide, and potassium butoxide. The preferred initiators are n-butyllithium, sec-butyllithium, and 3-butenyllithium.

Preferably the macromonomers of the invention have glass transition temperatures in the range of $-70°$ to above 300° C.

The living polymer anions of the present invention may be prepared using the methods described by Milkovich et al., (U.S. Pat. Nos. 3,786,116 and 3,842,059), the disclosures of which are incorporated herein by reference. The macromonomers of the present invention differ functionally from those of Milkovich et al. in that the macromonomers containing polar groups can be copolymerized under ZN conditions by complexing the polar groups with Lewis acid.

Process Conditions for Anionic Polymerization to Form the Z Group

The temperatures used for anionic polymerizations depend upon the monomer. Generally, the reaction can be carried out at a temperature ranging from about $-100°$ C. to about $+100°$ C. Furthermore, anionic polymerizations are carried out under controlled conditions that exclude substances which destroy the initiator or the living anion, such as water and oxygen. The polymerization is therefore carried out with nonpolar, anhydrous organic solvents under a blanket of an inert gas, such as nitrogen, argon or helium. The anhydrous solvents can also facilitate heat transfer and adequate mixing of the initiator and monomer. Preferred solvents are hydrocarbons or ethers and include saturated aliphatic nd cycloaliphatic hydrocarbons such as hexane, heptane, and aliphatic ethers such as dimethyl ether and diethyl ether; and cyclic ethers such as tetrahyorofuran.

Preparation of ω-alkenyl Terminated Macromonomers

By Termination Type A of Method I, the living polymer anion, $R^0-Z^\ominus$, can be terminated using an omega-ethylenically-unsaturated acid chloride terminating agent which yields a macromonomer containing a carbonyl linking group (L is

in Formula I).

By Termination Type B the living polymer anion can be reacted with ethylene oxide (or substituted ethylene oxide) to yield $R^0Z$-alkoxy anion. The alkoxy anion can be then further reacted with an omega-alkenyl carboxylic acid halide terminating agent to produce a macromonomer that contains an oxycarbonyl linking group (L in Formula I is a

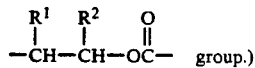 group.)

Summary Reactions I
Method I

Termination Type A

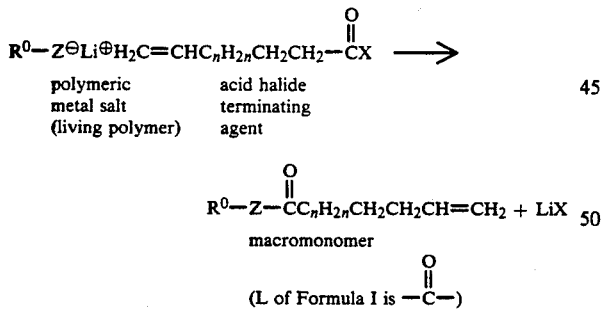

Termination Type B

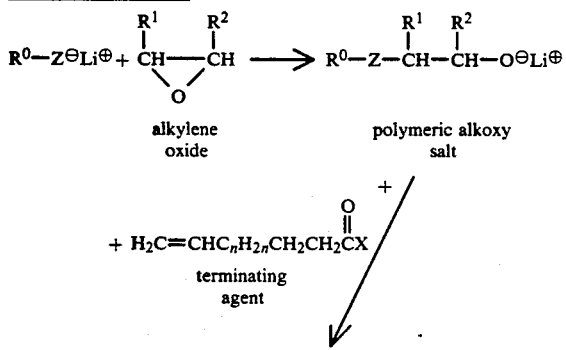

-continued
Summary Reactions I
Method I

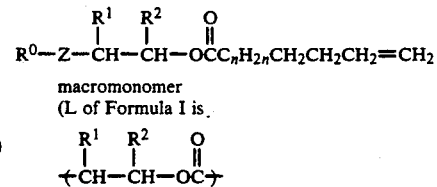

macromonomer
(L of Formula I is $$\begin{array}{ccc} R^1 & R^2 & O \\ | & | & || \\ +CH-CH-OC+ \end{array}$$

wherein $R^0$, $R^1$, $R^2$, n, and Z are as previously defined, and X is a halogen atom, preferably chloride.

By Termination Type C of Method I as shown in Summary Reactions II, the living polymer can be terminated using an omega-ethylenically-unsaturated chlorosilane terminating agent that yields a macromonomer containing a silyl linking group.

By Termination Type D of Method I, the living polymer can be reacted with an alkylene oxide and the alkoxy anion obtained can be terminated with an omega-ethylenically-unsaturated chlorosilane.

Macromonomers are obtained in high yield because the reactivity of Si-Cl bond increases the efficiency of the termination reaction. Silyl terminating agents also include omega-alkenyl di-, and tri-chlorosilanes thus permitting the preparation of branched and star macromonomers having narrow molecular weight distributions (as shown in Summary Reactions II below).

Summary Reaction II
Method I

Termination Type C

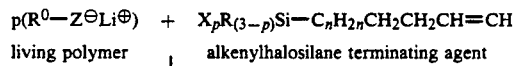
living polymer    alkenylhalosilane terminating agent

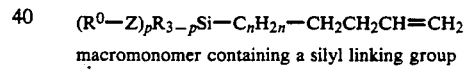
macromonomer containing a silyl linking group

Termination Type D

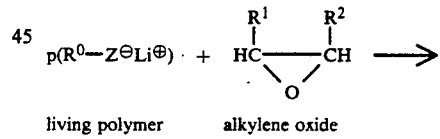
living polymer    alkylene oxide

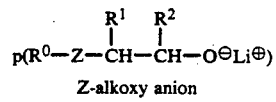
Z-alkoxy anion

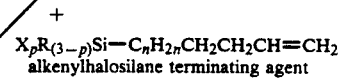
alkenylhalosilane terminating agent

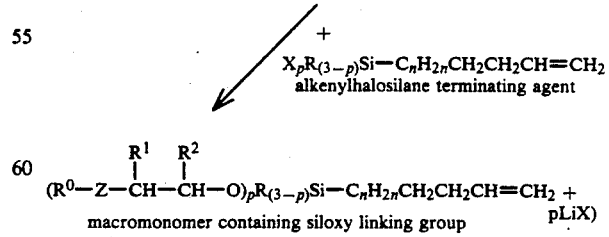
macromonomer containing siloxy linking group    pLiX)

wherein R, $R^0$, $R^1$, $R^2$, X, n, and p are defined previously.

In accordance with Method II, an omega-alkenyl alkali metal salt initiator can be used to initiate the anionic polymerization process. In the living polymer obtained, a coordinate bond links the alkenyl group to the polymer chain. The living anion can then be terminated by reaction with lower alcohol such as methanol, ethanol, or isopropanol as is well known in the art. The polymerization and termination reactions are summarized in Summary Reactions III, below.

nation reaction does not affect the conversion of living polymer to macromonomer.

Number average molecular weight of the macromonomer is determined by the initiator/monomer ratio and the amount of initiator may vary from about 0.001 to about 0.1 mole of active metal per mole of monomer or

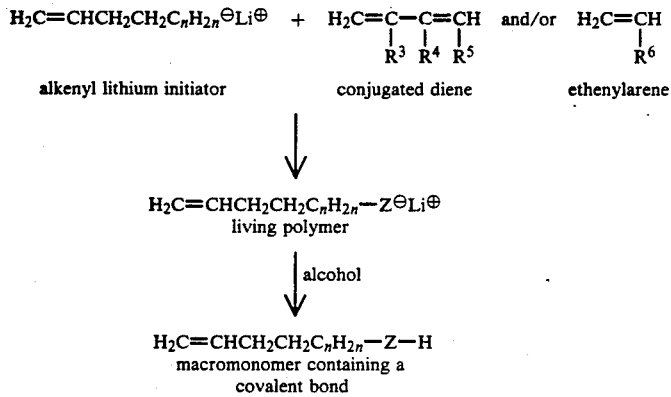

wherein $R^3$, $R^4$, $R^5$, $R^6$, Z and n are as previously defined.

Terminating agents for use in Method I, Termination Types A and B, may be chosen from alkenoyl chlorides containing up to 15 methylene groups and preferably 3 methylene groups or more. Illustrative alkenoyl chlorides include 5-hexenoyl chloride, 6-heptenoyl chloride, 7-octenoyl chloride, 9-decenoyl chloride, 10-undecenoyl chloride, 13-tetradecenoyl chloride, and 17-octadecenoyl chloride. The more preferred alkenoyl chlorides are 5 hexenoyl chloride and 10-undecenoyl chloride. The most preferred alkenoyl chloride is 10-decenoyl chloride.

Terminating agents for use in Method I, Termination Types C and D, may be chosen from omega-alkenylhalosilanes containing up to 18 methylene groups, preferably 4 or more methylene groups, which are commercially available (see *) or can be made using the methods disclosed in the Examples (infra). Illustrative ω-alkenylhalosilanes include, for example: 3-butenyldimethylchlorosilane 5-hexenyldimethylchlorosilane* 7-octenyldimethylchlorosilane* 2-methyl-5-hexenyldimethylchlorosilane 17-octadecenyldimethylchlorosilane 5-hexenylmethylphenylbromosilane 5-hexenyldiphenylchlorosilane 3-butenylmethyldichlorosilane 7-octenylmethyldibromosilane 5-hexenyltrichlorosilane* 7-octenyltrichlorosilane*

*These alkenylchlorosilanes are available from Petrarch Systems, Bristol, Pa. 19007.

Unlike prior art silyl group containing macromonomers prepared using unreactive vinylalkylhalosilanes, the silyl group containing macromonomers of the present invention are obtained in high yield because the Si-Cl bond of chlorosilane terminating agents is highly reactive, thus increasing the efficiency of the termination reaction. This increased termination efficiency facilitates the high yield preparation of branched and star macromonomers when di- and tri-chlorosilane terminating agents are used.

Since every Method II initiator molecule contains an alkenyl group, every resulting living polymer anion contains an alkenyl group; therefore, unlike Method I macromonomers, the efficiency and yield of the termihigher. Preferably, the concentration of the initiator will be from about 0.002 to about 0.04 mole active alkali metal per mole, of monomer. The smaller the initiator/monomer ratio the higher the number average molecular weight.

ZN Coordination Graft Copolymerization of Macromonomers with Alpha-Olefins

The inventive macromonomers readily copolymerize with ethylenically unsaturated monomers (preferably alpha-olefins) in the presence of ZN coordination catalysts. The omega-alkenyl group of the macromonomer has a plurality of methylene spacing groups that separate the vinyl group from resonance and steric effects of polar linking groups (L) if present. This separation 1) increases reactivity of the vinyl group, thus increasing the concentration of the macromonomer in the copolymer, and 2) reduces undesirable branching side reactions. It is believed to be unknown in the art that heteroatom-containing (i.e., at least one of Si and O atoms) macromonomers, such as those provided by methods I and II, can react with alpha-olefins in the presence of ZN coordination catalysts.

The macromonomer derived graft copolymer of the invention comprises units of:

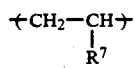

together with units of macromonomer having the structure:

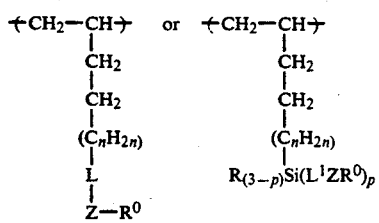

and preferably has the general formulae:

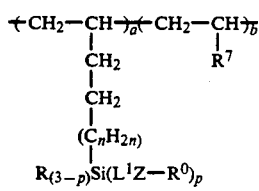

wherein

R$^7$ is hydrogen or an alkyl group having 1 to 16 carbon atoms;

L, L$^1$, n, p, R$^0$, R, and Z are as previously defined; and a and b are numbers providing a number average molecular weight of 50,000 to 10,000,000 to the graft copolymer, a having a value that is 0.1 to 25 weight percent of (a+b), preferably 0.1 to 10 weight percent of (a+b).

Copolymerization of at least one of ethylene and an alpha-olefin having the formula CH$_2$=CH—R$^7$, wherein R$^7$ is as defined above, and a macromonomer according to the present invention can be conducted using a ZN coordination catalyst. ZN coordination catalyst systems are described by Seymour and Carraher, supra, page 296. The preferred catalyst systems are dialkyl aluminum chloride/titanium trichloride or dialkyl aluminum sesquichloride vanadium oxytrichloride. Reaction takes place in the presence of inert solvents in the temperature range about −100° C. to about +100° C. Suitable nonpolar organic solvents include heptane, toluene, hexane, cyclohexane, pentane, and the like. The amount of solvent is generally about 10 to about 30% by weight based on the total weight of the reactants and solvent.

Furthermore, about 1.5 to 8 molar excess of a Lewis acid such as (C$_2$H$_5$)$_3$Al, AlCl$_3$, SnCl$_4$ and BCl$_3$, can be added to macromonomers containing carbonyl linking groups, to form complexes that eliminate the destructive interactions between polar linking group and the ZN catalyst during the copolymerization process. It is believed that the use of such complexes in ZN copolymerization is novel in the art.

Preferred alpha-olefin comonomers include, but are not limited to, linear alpha-olefins such as ethylene, propylene, 1-butene, 1-pentene, 1-hexene, 1-octene, 1-decene, 1-hexadecene, 1-octadecene, and the like; and branched alpha olefins such as 2-methylbutene, 3-methylhexene, 8-methyldecene and the like.

The macromonomers of the invention are useful as coatings on chromatographic supports such as polymers, ceramics, glass, preferably in the form of beads, bubbles, or fibers having high surface areas, and as intermediates for the preparation of a new class of alpha-olefin derived (by polymerization) graft copolymers. The type and ratio of monomers used determine the mechanical properties of the copolymers. Ratios of alpha-olefin monomer to macromonomer are in the range of 75 to 99.9 to 25 to 0.1. by weight. The copolymers can be useful as structural plastics, heat-activated structural adhesives, and xtrudable, low adhesion coatings.

In general, when the macromonomers are copolymerized with ethylene, propylene, butylene, or amylene the resulting graft copolymer is a structural plastic. In general, 1) when C$_6$–C$_{10}$ alpha-olefins are used to make the graft copolymer, naturally tacky pressure sensitive adhesives are obtained, 2) when C$_{11}$ to C$_{14}$ alpha-olefins are used, hot tackifying pressure sensitive adhesives or heat activated structural adhesives are obtained, and 3) when C$_{15}$ to C$_{18}$ alpha-olefins are used to make the graft copolymer, low adhesion coatings are obtained. However, from 0 to 40% by weight C$_2$ to C$_5$ alpha-olefin monomers can be included in graft copolymers to modify the polymer properties described above.

Objects and advantages of this invention are further illustrated by the following examples, but the particular materials and amounts thereof recited in these examples, as well as other conditions and details, should not be construed to unduly limit this invention.

EXAMPLES

The following detailed description includes examples of preparations of alkenyl-terminated macromonomers. The preparation of macromonomers 1 to 21 are described below and their molecular weight and polydispersity given in Table I. All parts and percents in the numbered examples are by weight unless otherwise specified. Presence of macromonomers in the copolymers was confirmed by gel permeation chromatography.

DEFINITION OF TERMS

The number-average molecular weight ($\overline{M}_n$) and weight average molecular weight ($\overline{M}_w$) are well known mathematical descriptions of the molecular weight distribution of a polymer sample.

The polydispersity, abbreviated "pp", is a measure of the molecular weight distribution of a macromonomer and is defined as $\overline{M}_w/\overline{M}_n$. In general "pp" for the copolymers of the present invention, are in the range 1.05 to 5, preferably 1.05 to 3.

Each of the foregoing terms is well known in the nomenclature used by polymer chemists and others. Further explanation of the derivation of these terms may be found in *Experimental Methods in Polymer Chemistry*, Wiley and Sons, 1981, Chapter 3 entitled "Molecular Weight Averages", pages 57–61.

GEL PERMEATION CHROMATOGRAPHY

The characterization of the molecular weight distribution of the polymeric monomers was carried out by conventional gel permeation chromatography (GPC).

A Hewlett-Packard Model 1084B, high performance liquid chromatograph, equipped with six (6) ultra STYRAGEL R TM columns of sizes 10⁶ A, 10⁵ A, 10⁴ A, 10³ A, 500 A and 100 A was used for all determinations. Samples were dissolved in toluene and filtered through a 0.5 micrometer polytetrafluoroethylene filter. Samples were injected at volumes of 170 μL to 200 μL and eluted at a rate of 1 ml per minute through the columns maintained at 40° C. Toluene was used as a solvent. The differential refractometer detector was a Hewlett-Packard Model 79877A. The system was calibrated using polystyrene standards. All GPC calculations were performed on a Hewlett-Packard Model 3388 integrator and all molecular weight averages are polystyrene equivalent molecular weights. The molecular weight averages and polydispersities were calculated according to standard procedures. GPC test methods are further explained in "Modern Size Exclusion Liquid Chromatography", Practical Gel Permeation Chromatography, John Wiley and Sons, 1979.

SYNTHESIS OF TYPE-A AND TYPE-B TERMINATING AGENTS 1a) 5-Hexenoic acid: ε-Caprolactone (40 g 0.35 mole) was added to a pyrolysis apparatus maintained at 600°-610° C. The lactone was added at the rate of 0.5-0.6 g/minute. 25 g of crude pyrolyzate was obtained. The product was mixed with a saturated aqueous solution of sodium bicarbonate and sodium chloride (150 mL) and stirred vigorously, followed by repeated extractions with toluene to isolate unreacted ε-caprolactone. The aqueous phase was acidified with 5% aqueous hydrochloric acid, resulting in formation of a pale yellow oil. The oil was isolated, combined with toluene (100 mL) and washed with saturated aqueous sodium chloride solution (50 mL).

The organic phase was dried over anhydrous magnesium sulfate and solvents removed. On distillation, a 22% yield of product boiling at 57°-59° C./0.18 mm was obtained that was confirmed by spectral analysis to be 5-hexenoic acid.

1b) 5-Hexenoyl chloride: A 100 ml, 3-necked flask fitted with reflux condenser, nitrogen inlet and outlet tubes and magnetic stirrer was charged with 5-hexenoic acid (10 g, 87.7 mmole). Thionyl chloride (12 g, 100 mmole) was then added dropwise over a period of 30 minutes. The reaction temperature was maintained at 25° C. by means of ice-water bath. Following the addition of thionyl chloride the reaction was stirred for 30 minutes at room temperature. The reaction was then heated to 75° C. until gas evolution ceased, cooled to room temperature, and stirred 12 hours under nitrogen atmosphere. The dark brown solution was distilled and an 85% yield of product boiling was obtained. Spectral analysis confirmed that it was the desired 5-hexenoyl chloride.

SYNTHESIS OF TYPE-C AND TYPE-D TERMINATING AGENTS 2a) 5-Hexenyldimethylchlorosilane: All glassware and syringes were oven dried at 110° C. overnight. 1,5-Hexadiene and dimethylchlorosilane were distilled under nitrogen prior to use. A three necked flask fitted with reflux condenser, septum, magnetic stirrer, nitrogen inlet and outlet connected to a paraffin oil bubbler was charged with 1,5-hexadiene (8.2 g, 100 mmole) and dimethylchlorosilane (4.7 g, 50 mmole). A platinum catalyst solution (3.5% Pt in xylene) (100 ppm) was added to the reaction mixture, maintained at 50° C., with a syringe through the septum. The mixture was refluxed for several hours. The rate of reaction was followed by infrared spectroscopy. At the end of the reaction the desired product distilling at 56° C./0.32 mm was obtained in 56% yield.

2b) 7-Octenyldimethylchlorosilane: Procedure is similar to the one described above. A mixture of 18.6 g (166 mmole) of 1,7-octadiene, and 100 ppm of of platinum catalyst solution (3.5% Pt in xylene) was refluxed under nitrogen. At the refluxing temperature 8.0 g (85 mmole) of dimethylchlorosilane was added dropwise. The mixture was further refluxed for several hours. The completion or the reaction was monitored by infrared spectroscopy. A nitrogen atmosphere was maintained throughout the course of the reaction. The mixture was vacuum distilled and a product boiling at 48°-50° C./0.19 mm was obtained in 56% yield and stored under anhydrous condition to prevent isomerization to the internal olefin.

2c) 5-Hexenylmethyldichlorosilane: Procedure is similar to the one described above for 5-hexenyldimethylchlorosilane. 8.4 g (100 mmole) of 1,5-Hexadiene was refluxed with platinum catalyst (100 ppm). To the mixture 5.7 g (50 mmole) of methyldichlorosilane was added dropwise over 30 min. period. The completion of the reaction was monitored by infrared spectroscopy. The product distilling at 65° C./0.22 mm was obtained in 68% yield.

2d) 7-Octenylmethyldichlorosilane: The procedure is similar to the one described for 5-hexenylmethyldichlorosilane. The product distilling at 58° C./0.1 mm was obtained in 46% yield.

2e) 5-Hexenyltrichlorosilane: The procedure is similar to the one described for 5-hexenyldichlorosilane. The product was distilled at 35°-38° C./0.5 mm in 37% yield.

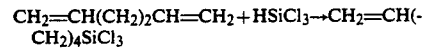

2f) 7-Octenyltrichlorosilane: The procedure is similar to the one described for 5-hexenyldichlorosilane. The product distilling at 45°-48° C./0.15 mm was obtained in 39% yield.

SYNTHESIS OF ALKENYL INITIATORS

3a) Preparation of bis(3-butenyl)mercury: To a solution of 3-butenylmagnesium bromide, prepared from 25 g of 1-bromo-3-butene (187 mmole) and 5 g of magnesium (208 mmole) in 40 mL of tetrahydrofuran, was added dropwise, at 50° C. with stirring, a solution of 25.2 g of mercuric chloride (93 mmole) in tetrahydrofuran. After stirring for 2 hours at 60° C., the reaction mixture was hydrolyzed with water at 0°-5° C. Organic layer was separated from aqueous layer; the product was distilled to give bisbutenyl mercury in 60% yield. The yield of the desired product was confirmed by gas chromatography (GC) and ¹H NMR.

b) Preparation of 3-butenyllithium : 3-Butenyllithium was prepared by reacting 1.5 g (0.22 mole) of lithium dispersed in 100 mL of hexane with 50 mmole of bis-3-butenylmercury. The reaction was monitored by GC. Filtration afforded a quantitative yield of 3-butenyllithium as indicated by titration with HCl.

3c) Preparation of bis(4-pentenyl)mercury : To a solution of 4-pentenyl magnesium bromide, prepared from 25 g of 1-bromo-4-pentene (169 mmole) and 5 g of magnesium (208 mmole) in 40 mL of tetrahydrofuran, was added dropwise at 50° C. with stirring a solution of 25.2 g of mercuric chloride (93 mmole) in 50 mL of tetrahydrofuran. After stirring for 2 hours at 60° C., the reaction mixture was hydrolyzed with water at 0°–5° C. The organic layer was separated from aqueous layer; the product was distilled to give bis-3-butenyl mercury in 67% yield. The identity of the compound was confirmed by gas chromatography and $^1$H NMR.

3d) Preparation of 4-pentenyllithium : 4-Pentenyllithium was prepared by reacting 1.5 g (0.22 mole) of lithium dispersion in 100 mL of hexane with 50 mmole of bis(4-pentenyl)mercury. The reaction was monitored by gas chromatography. Filtration afforded a quantitative yield of 4-pentenyllithium as indicated by titration with HCl.

PREPARATION OF SUBSTITUTED STYRENE MONOMERS 4a) 4-(Trimethylsilyl)styrene : A solution of trimethylchlorosilane (7.82 g, 72.4 mmole) in dry tetrahydrofuran(THF) (40 mL) was added dropwise over a 90 minute period to a solution of (4 vinylphenyl)magnesium chloride, prepared from 4-vinylphenylchloride (10 g, 72.4 mmole) and magnesium (2.43 g, 100 mmole) in dry THF (100 mL). Temperature was maintained at 10° C. during the addition. The reaction mixture was stirred at room temperature over 20 hours under nitrogen atmosphere. The crude product was obtained by direct distillation at 45°–48° C./0.5 mm in 45% yield.

4b) 2-Propoxydimethylchlorosilane : Isopropanol (12.04 g, 200 mmole) and triethylamine (20.2 g, 200 mmole) in 100 mL n-hexane were slowly added to a stirred solution of dimethyldichlorosilane (25.78 g, 200 mmole) in n-hexane (100 mL) over a period of 90 minutes, at 0° C. under nitrogen atmosphere. After the mixture was stirred for 6 hours at room temperature, the white solid was filtered and washed with n-hexane. The combined filtrate was fractionally distilled and the desired product boiling at 35° C./10 mm was obtained in 24% yield.

4c) (4-Vinylphenyl)dimethyl-2-propoxysilane : A solution of isopropoxydimethylchlorosilane (15.2 g, 100 mmole) in dry THF (50 mL) was added dropwise over a 1 hour period to a solution of (4-vinylphenyl)magnesium chloride, prepared from 4-vinylphenyl chloride (13.85 g, 100 mmole) and magnesium (3.0 g, 125 mmole) in dry 100 mL THF. The temperature was maintained at 10° C. during the addition. The reaction mixture was stirred at room temperature for over 18 hours. The desired product distilling at 45°–49° C./0.2mm was obtained in 45% yield.

4d) 4-[N-(Trimethylsilyl)amino]styrene : 4-Aminostyrene (11.8 g, 98 mmole) and hexamethyldisilazane (32 g, 200 mmole) were refluxed at 125° C. for 3 hours. Unreacted hexamethyldisilazane was removed under vacuum. The desired product distilling at 51°–54° C./0.18mm was obtained in 85% yield. Its composition was confirmed by spectral analysis.

4e) 4-[N,N-bis(trimethylsilyl)amino]styrene : To a solution of ethylmagnesium bromide in THF (0.6 M, 150 mL) was added dropwise 4-[N-(trimethylsilyl)amino]styrene (8.4g, 44 mmole) with stirring. The mixture was stirred at 40° C. for 16 hours. To the resulting solution was added trimethylsilylchloride (13 g, 120 mmole)and the mixture stirred at room temperature for 6 hours. By fractional distillation, a product was isolated at 45°–48° C./0.32 mm in 55% yield. The product was confirmed by spectral analysis to be the desired compound.

4f) 4-[2-(tert-Butyldimethylsilyloxyethyl]styrene : 4-Vinylphenylethanol (15 g, 101 mmole was reacted with slight excess of tert-butyldimethylsilyl chloride (18 g, 120 mmole)in presence of imidazole in DMF at 30° C. for 5 hours. Water was then added and the mixture was extracted with chloroform. The chloroform layer was dried over MgSO$_4$, and the solvent was removed by evaporation. By fractional distillation of the crude product, a 65% yield of material boiling at 55° C./0.25 min. was isolated and confirmed by spectral analysis to be the desired compound.

EXAMPLE 1

Synthesis of Macromomers by Method I

Specific detail of the repeating monomeric unit ("Repeating Unit"), chemical type of termination ("Termination"), the molecular weights (rounded to the nearest thousand) and polydispersity ("Polydispersity") are given in Table I.

Macromonomer 1 (Comparative Example)

An acrylate-terminated polystyrene polymeric monomer having a number average molecular weight of about 13,000 was prepared. A 5 liter, four necked flask, fitted with a thermometer, mechanical stirrer, septum, Dean-Stark trap and condenser was charged with 1200 g reagent grade toluene heated there in to reflux under a slow argon stream. A small portion (150 g) of the toluene was removed through the trap to eliminate water from the system, leaving approximately 1050 g of toluene.

Styrene monomer was first purified by passing over 200 mesh silica gel under argon and then 104 g of this styrene monomer was introduced into the reaction flask by syringe through the septum to produce 10% by weight of the solution of styrene monomer in toluene. The solution was maintained at 60° C. About 5 to 10 drops of a 1.4M solution of n-butyllithium in hexane was added dropwise to the monomer solution until a faint yellow color persisted, indicating completion of the reaction with the impurities. Then 6.15 mL of the solution was added rapidly, causing an exothermic reaction. The flask contents were maintained at 60° C.

The rate of consumption of the monomer was followed by gas chromatography. The reaction was essentially completed in 1 hour. The reaction was run an additional 2 hours to ensure the complete conversion of the monomer to the polymer. The contents were cooled to 35° C. Ethylene oxide gas was introduced over the reaction mixture and the solution was rapidly agitated for 15 minutes until the orange color of the polystyryllithium had completely disappeared. The reaction was then quenched with 5 mL of freshly distilled acryloyl chloride. The reaction mixture was stirred for an additional 2 hours at room temperature.

The resultant macromonomer solution was reduced in volume to approximately one-third and added dropwise to a large excess of isopropanol. The precipitated polymer was collected on a large sintered funnel, dried overnight under ambient conditions, further dried at 65° C. for 24 hours in a forced air oven and finally completely dried in vacuo.

Gel permeation chromatography revealed a number average molecular weight ($\overline{M}_n$) of 12,500, a weight average molecular weight ($\overline{M}_w$) of 13,750, and polydispersity (pp) of 1.1 and the structure:

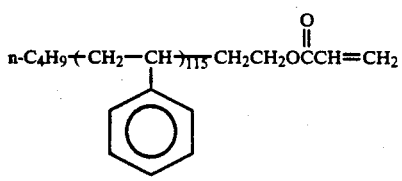

Macromonomer 2, Type B Termination

A 5-hexenoate-terminated polystyrene polymeric monomer having a number average molecular weight of about 10,000 was prepared, generally following the procedure set out above for the preparation of Macromonomer 1. In the preparation of this monomer, however, 15 g (144 mmoles) of styrene were charged into a 250 mL flask containing 150 g toluene, resulting in an 10% by weight solution. The solution was heated to about 60° C. and a 1.4M solution of n-butyllithium in hexane was added dropwise until a faint yellow color persisted, then 1.07 mL of additional n-butyllithium hexane solution were added rapidly. The reaction mixture was maintained at 60° C. throughout the course of the reaction. After about 3 hours, the solution was cooled to 35° C. and then ethylene oxide gas was introduced over the reaction mixture which was stirred rapidly for 15 minutes until the orange color of polystyryllithium had disappeared. The reaction was then quenched with 0.589 ml (4.494 mmole) of 5-hexenoyl chloride. The macromonomer polymer solution was reduced in volume and the polymer precipitated and dried as described above. Gel permeation chromatography revealed a number average molecular weight of 9964, weight average molecular weight of 10,561, polydispersity of 1.06 and the structure

The macromonomer (3g) and 0.03g of dicumyl peroxide was dissolved in 200 ml of toluene and 100 g of chromatographic quality silica having a pore size of 100 to 300 Å (available from Aldrich Chemical Co.) were added to the solution. The solution was tumbled for about 1 hour, filtered and the treated beads heated at 150° C. for 3 hours to effect polymerization of the macromonomer, as confirmed by spectral analysis, on the beads. The treated beads were found useful in a chromatographic column for the separation of proteins and also high boiling organic compounds.

Macromonomer 3a, Type B Termination

A 10-undecenoate terminated polystyrene polymeric monomer having a number average molecular weight of about 5,000 was prepared according to the procedure utilized in the preparation of Macromonomer 1 described above. Styrene monomer (30 g, 288 mmole) was added to 375 g of toluene, resulting in a 7% by weight of the solution. A 1.4 M solution of n-butyllithium in hexane (4.3 mL) was added to the monomer solution and the reaction was permitted to proceed as described for Macromonomer 1. The reaction was quenched with 3.6 g, a 3-fold molar excess, of 10-undecenoyl chloride. Analytical results of the resultant macromonomer were as follows: $\overline{M}_n = 4750$, $\overline{M}_w = 5664$ and pp = 1.2.

Macromonomer 3b, Type B Termination

A 10-undecenoate terminated polystyrene polymeric monomer having a number average molecular weight of about 10,000 was prepared. The procedure was the same as that used to prepare Macromonomer 3a except that the amounts of lithium initiator, styrene monomer, and the end capping agent were selected to produce the polymeric monomer of about twice the Macromonomer 3a molecular weight, i.e., 10,000. The macromonomer obtained was analyzed by gel permeation chromatography which gave the following results: $\overline{M}_n = 10,054$, $\overline{M}_w = 13,272$, and polydispersity of 1.32.

Macromonomer 3c, Type B Termination

A 10-undecenoate-terminated polystyrene polymeric monomer having a number average molecular weight of about 13,000 was prepared. The procedure was the same as that used to prepare Macromonomer 3a except that the amounts of lithium initiator, styrene monomer, and end capping agent were selected to produce the polymeric monomer of about 13,000 molecular weight. The monomer obtained was analyzed by gel permeation chromatography which gave the following results: $\overline{M}_n = 13,059$, $\overline{M}_w = 14,564$ and polydispersity of 1.11.

Macromonomer 3d, Type B Termination

A 10-undecenoate-terminated polystyrene polymeric monomer having a number average molecular weight of about 18,000 was prepared. The procedure was the same as that used to prepare Macromonomer 3a except that the amounts of lithium initiator, styrene monomer, and the end capping agent were selected to produce the polymeric monomer of about 18,000 molecular weight. The monomer obtained was analyzed by gel permeation chromatography which gave the following results: $\overline{M}_n = 18,060$, $\overline{M}_w = 20,254$ and polydispersity of 1.12.

Macromonomer 4, Type B Termination

A 10-undecenoate-terminated polyisoprene macromonomer having a number average molecular weight of about 10,000 was prepared. The procedure was the same as that used to prepare Macromonomer 1 except that the amounts of lithium initiator, isoprene monomer, and the coupling agent were selected to produce a macromonomer of about 10,000 molecular weight. The macromonomer obtained was analyzed by gel permeation chromatography which gave the following results: $\overline{M}_n = 9750$, $\overline{M}_w = 12090$ and a polydispersity of 1.24. The macromonomer (3 g) and 0.3 g of dicumyl peroxide catalyst were dissolved in 200 ml toluene coated onto Zirconia beads of 100A and then cured by heating at 150° for 3 hours. These beads were used as solid supports in chromatographic separations of proteins.

Macromonome 5

A 10-undecenoate-terminated poly(myrecene) macromonomer having a number average molecular weight of about 10,000 was prepared. The procedure was the same as that used to prepare Macromonomer 3 except that the amounts of lithium initiator, myrecene monomer, and terminating agent were selected to produce the macromonomer of about 10,000 molecular weight. The macromonomer obtained was analysed by gel permeation chromatography which gave the following results: $\overline{M}_n = 9860$, $\overline{M}_w = 13,300$, and polydispersity of 1.35.

EXAMPLE 2

Macromonomers by Method I, Type C Termination

Macromonomer 6a

A 5-hexenyldimethylsilyl terminated polystyrene polymeric monomer having a number average molecular weight of about 2,000 was prepared. An oven dried 500 mL two necked flask equipped with a magnetic stirring bar, condenser, and a septum, was purged with dry argon and was charged with 10 g of styrene in 200 g of toluene (5% by weight of solution). The solution was heated to about 60° C. and 2.8 ml of 1.4 M solution of n-butyllithium in hexane was added dropwise until a faint yellow color persisted, then 3.3 ml of additional n-butyllithium in hexane solution were added rapidly. The reaction mixture was maintained at 60° C. throughout the course of the reaction. The progress of the reaction was monitored by gas chromatography. The reaction was essentially completed in 1 hour. The reaction was run an additional 2 hours. The reaction mixture was cooled to 35° C. and then 2.3 g, a 3-fold molar excess, of 5-hexenyldimethylchlorosilane was added to quench the reaction. The solution was reduced in volume and the macronomer was precipitated and dried as described in Macromonomer 1. Gel permeation chromatography revealed a number average molecular weight of 2,100, weight average molecular weight 2,243, and polydispersity of 1.07. Chromatographic beads prepared with this monomer was also useful for the separation of proteins.

Macromonomers 6b to 6d 5-hexenyldimethylsilyl-terminated polystyrene polymeric monomers having number average molecular weights of about 4,000, 8,000, and 14,000 were prepared following a procedure similar to that given above for the preparation of Macromonomer 6a except that the concentrations of lithium initiator and styrene monomer were selected to produce polymeric monomers of above mentioned molecular weights. The results are shown in Table I.

Macromonomers 7a and 7b 7-octenyldimethylsilyl-terminated polystyrene polymeric monomer having number average molecular weights of 8,000 and 11,000 were prepared. The procedure was same as that used to prepare Macromonomer 6a except that the concentrations of lithium initiator and styrene monomer were selected to give the above molecular weights. The monomers produced were analyzed by gel permeation chromatography. The results are shown in Table I.

Macromonomer 8 (random copolymer)

A 7-octenyldimethylsilyl-terminated poly(50-styrene-co-50-isoprene) macromonomer having a number average molecular weight of 8,000 was prepared similar to Macromonomer 6a except that the amounts of lithium initiator and equimolar styrene and isoprene monomer (equimolar quantities) mixture were selected in such a way so that the desired molecular weight could be obtained. The macromonomer having random copolymer was analyzed by gel permeation chromatography. The results are shown in Table I.

Macromonomer 9 (block copolymer)

A 7-octenyldimethylsilyl-terminated poly(50-styrene-b-50-isoprene) macromonomer having a number average molecular weight of 8,000 was prepared. Styrene, 5 g (48 mmole) was added to 100 g of toluene under anhydrous conditions in the reaction flask producing 5 weight percent solution of monomer in the solvent. Approximately 5 to 10 drops of a 1.4 M solution of n-butyllithium in hexane were added to the monomer solution to remove impurities and then 0.58 ml of n-butyllithium were rapidly added, resulting in an exothermic reaction. The reaction was maintained at 60° C. during the reaction. Upon consumption of the styrene monomer, the reaction was cooled to ambient temperature. The second monomer isoprene (5 g) was added in sequential addition. The reaction was allowed proceed for another 3 hours. The reaction was quenched with 3-fold molar excess of 7-octenyldimethylchlorosilane (0.5 g). The reaction was stirred for an additional 18 hours to ensure quantitative termination. The solution was reduced and added, as described above, to methanol precipitating the macromonomer which was collected and dried. The molecular weight data is listed in Table I.

Macromonomer 10

A 7-octenydimethylsilyl-terminated poly(t-butylstyrene) macromonomer having a number average molecular weight of about 11,000 was prepared. Tert-butylstyrene (10 g, 62.5 mmole) was added to 100 g of toluene under anhydrous conditions in the reaction flask producing a 10 weight percent solution of monomer in the solvent. Approximately 5 to 10 drops of a 1.4M solution of n-butyllithium in hexane were added to the monomer solution to remove impurities and then 0.58 ml of the n-butyllithium were rapidly added, resulting in an exothermic reaction. The reaction temperature was maintained at 60° C. during the reaction. Upon completion of the reaction the mixture was cooled to 35° C. A 3-fold molar excess of 7-octenyldimethylchlorosilane (0.5 g) was then added. The reaction was stirred for an additional 18 hours to complete the termination reaction. The solution was reduced and added as described above to methanol precipitating the macromonomer which was collected and dried. Analytical results gave the following: $\overline{M}_n = 11,373$ and $\overline{M}_w = 3,465$ and polydispersity of 1.18.

Macromonomer 11

A 7-octenyldimethylsilyl-terminated polyvinyltoluene macromonomer having a number average molecular weight of 10,000 was prepared according to the procedure set out for Macromonomer 10. The charge to the reaction flask was 175 g toluene, 16 g (135 mmole) vinyltoluene and 1.14 ml of 1.4M n-butyllithium-hexane solution, using 0.98 g of 7-octenyldimethylchlorosilane to terminate the living polymer and form the macromonomer. Macromonomer analysis results were as follows : $\overline{M}_n = 9521$, $\overline{M}_w = 12,540$, and polydispersity of 1.32.

Macromonomers 12, 13, 14, and 15

7-octenyldimethylsilyl-terminated macromonomers were prepared by the following general procedure: A 100 ml, three-necked flask was charged with 50 ml of toluene and 5 g of functional substituted styrene. The contents were maintained at −78° C. N-butyllithium (1.2 mL of 1.4M) was added at low temperature to produce the macromonomer with molecular weights as shown in TABLE I. The polymerizations were terminated with 7-octenyldimethylsilylchlorosilane. The reaction mixtures were warmed slowly to 35° C. temperature and maintained at that temperature for two more hours. The macromonomers were collected by precipitation after adding large excess of methanol. They were redissolved in toluene, precipitated into methanol and dried under inert conditions. NMR analysis showed about 60 mole percent coupling in all cases. The molecular weights of these macromonomers are listed in TABLE I.

Macromonomer 16

A 5-hexenylmethylsilyl-terminated two-armed polystyrene macromonomer having a number average molecular weight of each arm of about 5,000 and the polymeric monomer having a number average molecular weight of about 10,000, was prepared. An oven-dried 500 mL two necked flask equipped with a magnetic stirring bar, condenser, and a septum was purged with dry argon and charged with a dilute solution of styrene (10 g) in toluene (200 g). 1.4 ml of 1.4M n-butyllithium was introduced and the reaction continued for 3 hours. The progress of the reaction was monitored by GC analysis of the reaction mixture. Thereafter the terminating agent, 5 hexenylmethyldichlorosilane (0.172 g, 0.997 mmole), was introduced and the reaction mixture was stirred overnight at 35° C. The resultant macromonomer solution was precipitated into an excess of methanol with vigorous stirring. The macromonomer was further purified following the procedure given for purification of Macromonomer 1. Gel permeation chromatography revealed a number average molecular weight $(\overline{M}_n)=9,584$ and a weight average molecular weight $(\overline{M}_w)=12,060$, resulting in a polydispersity of 1.26.

Macromonomer 17

A 7-octenylmethylsilyl terminated two-armed polystyrene macromonomer having a number average molecular weight of each arm of about 5,000 and thus having a number average molecular weight of the polymeric monomer of about 10,000 was prepared by the procedure outlined for Macromonomer 16 except that the amounts of lithium initiator and terminating agent were selected to give the desired molecular weight. The macromonomer was purified by the procedure described above. Gel permeation chromatography revealed a number average molecular weight $(\overline{M}_n)=10,375$ and a weight average molecular weight of $\overline{M}_w=13,465$, resulting in a polydispersity of 1.29.

Macromonomers 18 and 19

A 5-hexenysilyl terminated and 7-octenylsilyl-terminated three-armed polystyrene macromonomers were prepared similar to the procedure outlined for Macromonomer 16. In this synthesis the molecular weight of each arm was about 5,000 with a total molecular weight of the polymer of about 15,000 was desired. The terminating agents used for these syntheses were 5-hexenyltrichlorosilane and 7-octenyltrichlorosilane. One third molar concentration of terminating agents with respect to the concentration of butyllithium was added. Gel permeation chromatography revealed mixtures of two and three arm macromonomers (see TABLE I.)

EXAMPLE 2

SYNTHESIS OF MACROMONOMERS BY METHOD II

Macromonomer 20a

A 3-butenyl terminated polystyrene macromonomer having a number average molecular weight of about 12,000 was prepared. Styrene (15 g, 144 mmole) was added to 200 g of cyclohexane under anhydrous conditions in the reaction flask producing 7.5 weight percent solution of monomer in the solvent. Approximately 5 to 10 drops of 0.07 molar solution of 3-butenyllithium in hexane were added to the monomer solution to remove impurities and then 19.7 mL of the 3-butenyllithium were rapidly added at 0°–5° C. The temperature of the reaction was slowly raised to 60° C. and maintained at that temperature throughout the course of the reaction. Living polystyryl lithium anion formation was slower with this catalyst than with sec-butyllithium. Progress of the reaction was monitored by gas chromatography. The styrene monomer consumption was complete in about 3 hours. The reaction was run for an additional 18 hours. The reaction was terminated with excess methanol. The solution volume was reduced and added as described above to methanol to precipitate the macromonomer which was collected and dried. Analytical results were as follows: $\overline{M}_n=11,570$, $\overline{M}_w=14,576$, and polydispersity of 1.25. Structure analysis confirmed the product $H_2C=CHCH_2CH_2-Z-H$.

Macromonomer 20b

A 3-butenyl-terminated polystyrene macromonomer having a number average molecular weight of about 22,000 was prepared according to the procedure utilized in the preparation of Macromonomer 20a described above. Styrene monomer (15 g, 144 mmole) was added to 200 g of cyclohexane, resulting in a 7.5 weight percent solution. A 0.07 molar solution of 3-butenyllithium in hexane (9.7 mL) was added to the monomer solution and the reaction was permitted to proceed as described for Macromonomer 20a. The reaction was terminated by the addition of methanol to precipitate the macromonomer and purified as described above. NMR end group analysis showed $\overline{M}_n$ to be 22,000.

Macromonomer 21

A 4-pentenyllithium-terminated polystyrene macromonomer having a number average molecular weight of about 11,000 was prepared. The procedure was the same as that used to prepare Macromonomer 20a except that the amounts of lithium initiator, and styrene monomer were selected to give a polymeric monomer of about half the molecular weight of the Macromonomer 20b. The macromonomer produced was analyzed by gel permeation chromatography which gave the following results: $\overline{M}_n=11,345$, $\overline{M}_w=14,764$, and polydispersity of 1.30.

TABLE I

| Copolymer Designation | Repeating Unit | Termination | Molecular weight (Mw) | Polydispersity (pp) |
|---|---|---|---|---|
| 1 | styrene | acrylate | 13,000 | 1.10 |
| 2 | styrene | 5-hexenoyl | 11,000 | 1.06 |
| 3a | styrene | 10-undecenoyl | 6,000 | 1.20 |
| 3b | styrene | 10-undecenoyl | 13,000 | 1.32 |

TABLE I-continued

| Co-polymer Designation | Repeating Unit | Termination | Molecular weight (Mw) | Polydispersity (pp) |
|---|---|---|---|---|
| 3c | styrene | 10-undecenoyl | 15,000 | 1.11 |
| 3d | styrene | 10-undecenoyl | 20,000 | 1.12 |
| 4 | isoprene | 10-undecenoyl | 10,000 | 1.24 |
| 5 | myrcene | 10-undecenoyl | 10,000 | 1.35 |
| 6a | styrene | 5-hexenyldimethylsilyl | 2,000 | 1.07 |
| 6b | styrene | 5-hexenyldimethylsilyl | 5,000 | 1.24 |
| 6c | styrene | 5-hexenyldimethylsilyl | 10,000 | 1.26 |
| 6d | styrene | 5-hexenyldimethylsilyl | 18,000 | 1.32 |
| 7a | styrene | 7-octenyldimethylsilyl | 10,000 | 1.16 |
| 7b | styrene | 7-octenyldimethylsilyl | 15,000 | 1.42 |
| 8 | styrene-co-isoprene | 7-octenyldimethylsilyl | 10,000 | 1.28 |
| 9 | styrene-b-isoprene | 7-octenyldimethylsilyl | 10,000 | 1.31 |
| 10 | tert.butyl styrene | 7-octenyldimethylsilyl | 13,000 | 1.18 |
| 11 | vinyltoluene | 7-octenyldimethylsilyl | 13,000 | 1.32 |
| 12 | (4 vinylphenyl) dimethyl-2-propoxysilane | 7-octenyldimethylsilyl | 5,000 | 2.23 |
| 13 | 4-(tert.-butyldimethylsiloxy)ethylstyrene | 7-octenyldimethylsilyl | 6,000 | 2.57 |
| 14 | 4-(N,N-bis-(trimethylsilyl)amino)styrene | 7-octenyldimethylsilyl | 9,000 | 3.18 |
| 15 | 4-(Trimethylsilyl)polystyrene | 7-octenyldimethylsilyl | 12,000 | 1.32 |
| 16 | styrene | 5-hexenylmethylsilyl | 10,000 | 1.26 |
| 17 | styrene | 7-octenylmethylsilyl | 13,000 | 1.29 |
| 18 | styrene | 5-hexenylsilyl | 15,000 | 1.56 |
| 19 | styrene | 7-octenylsilyl | 15,000 | 1.48 |
| 20a | styrene | 3-butenyl | 15,000 | 1.25 |
| 21 | styrene | 4-pentenyl | 15,000 | 1.30 |

EXAMPLE 3

Graft Copolymerization of Method I Type B Macromonomers with Ethylene and Alpha-Olefins 8a) Copolymerization of Ethylene with (Polystyryl)ethyl 10-Undecenoate (Macromonomer 3a)

This example illustrates the preparation of graft copolymer having a polyethylene backbone and polystyrene side chains. (Polystyryl)ethyl 10-undecenoate (2.5 g) Macromonomer 3a was dissolved in 20 g of dry toluene in a two necked 100 ml round bottomed flask fitted with argon inlet and a rubber septum. 1.0 ml of diethylaluminum chloride (1.8M) in toluene was then added to the macromonomer to form a Lewis acid complex comprised of macromonomer and the Group III metal portion of the ZN catalyst. The complex was transferred to a dry pressure reactor equipped with a stirrer and argon inlet and outlet. The reactor was charged with 240 g of dry toluene, 1.0 ml of (1.8M) diethylaluminum chloride in toluene, and 0.1 g of AATiCl₃, (aluminum activated reduced titanium trichloride available from Stauffer Chemical Co. Inc. (Westport, Conn.)). The molar ratio of Al to Ti in the ZN catalyst was 5.5 to 1. The reactor was pressured with 47.5 g of ethylene gas. The copolymerization was exothermic, and the temperature of reaction, increased to 50° C. After 2 hours of reaction, the reaction mixture was deactivated with methanol. The powdered copolymer was washed with toluene to remove the unreacted macromonomer. No extractables were found indicating incorporation of the macromonomer in the polyolefin copolymer. The copolymer was thoroughly washed with methanol. The copolymer was stabilized with an antioxidant, Irganox TM 1010 (available from Ciba Geigy), (3.25% by weight) and dried in a vacuum oven at 60°-70° C. to constant weight. About 42 g of copolymer was isolated. Coatings prepared from solutions of the polymer were tough and abrasion resistant.

8b) Copolymerization of Ethylene with (Polystyryl)ethyl 10-Undecenoate (Macromonomer 3a)

The procedure of Example 8a was repeated except that the catalyst system was changed to vanadium oxytrichloride and diethylaluminum sesquichloride in which the V to Al ratio was 5.5 to 1.

8c) Copolymerizatization of Ethylene with (Polyisoprenyl)ethyl 10-Undecenoate (Macromonomer 3a)

The procedure of Example 8a was repeated except that isoprene macromonomer (Macromonomer 3a) was used to prepare the copolymer. The weight ratio of ethylene to macromonomer in the feed was 95 to 5.

8d) Copolymerization of Propylene with (Polystyryl)ethyl 10-Undecenoate (Macromonomer 3a)

The procedure of Example 8a was repeated except that 95 g of propylene and 5 g of macromonomer were used to prepare the copolymer.

8e) Copolymerization of 1-Hexene with (Polystyryl)ethyl 10-Undecenoate (Macromonomer 3a)

Figure 2:
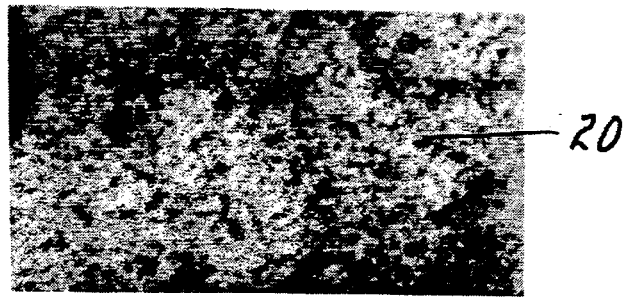

5 g of (polystyryl)ethyl 10-undecenoate (Macromonomer 3a) was dissolved in 20 g of toluene in a dry two-necked flask fitted with argon inlet and out let and rubber septum. 1.0 ml of (1.8 M) diethylaluminum chloride was then added to the macromonomer to form the macromonomer-ZN catalyst complex. In a dry kettle equipped with a stirrer and argon inlet and outlet, 95 g of 1-hexene monomer and 480 g of dry toluene were charged. The macromonomer solution was cannulated under argon to the kettle. The polymerization was initiated by charging a ZN catalyst consisting of 1.0 ml of 1.8M diethylaluminum chloride and 0.11 g of AATiCl₃. The molar ratio of Al to Ti in the catalyst was 5:1. Polymerization proceeded with a slight exotherm. After 3 hours, methanol was added to deactivated the catalyst. The methanol was decanted from the copolymer and the soft, sticky, colorless copolymer was further washed with excess methanol to remove the catalyst residues. The copolymer was stabilized with 0.25% Irganox 1010 and vacuum dried at 60°-70° C. to constant weight. The yield of copolymer was 68 g (68% conversion). The tacky copolymer had a $T_g$ of −42° C. due to poly(1-hexene) and 85° C. due to polystyrene by differential scanning calorimetric (DSC) analysis. FIG. 2 shows phase segregated domains 20 due to polystyryl grafted groups in the copolymer.

8f) Copolymerization of 1-Octene with (Polystyryl)ethyl 10-Undecenoate (Macromonomer 3a)

The procedure of Example 8e was repeated except that the weight ratio of ethylene to macromonomer was 90 to 10. The ratio between Al to Ti was 7 to 1. The copolymer yield was 57%.

EXAMPLE 4

Graft Copolymerization of Method I Type C Terminated Macromonomers with Ethylene and Alpha-Olefins

9a) Copolymerization of Ethylene with 5-Hexenyldimethylsilylpolystyrene (Macromonomer 6a)

5-Hexenyldimethylsilylpolystyrene (2.5 g) was dissolved in 10 g of dry toluene in a dry pressure reactor equipped with stirrer, and thermocouple. The reactor was charged with 240 g of dry toluene, 0.12 g of AATiCl$_3$ and 1.0 ml of 1.8M diethylaluminum chloride. The molar ratio of Al to Ti in the ZN catalyst was 2.3 to 1. The reactor was pressurized with about 47.5 g of ethylene gas. The copolymerization was slightly exothermic. The reaction was maintained at 25° C. for 18 hours. The catalyst was deactivated by adding a small amount of methanol. The copolymer was washed with toluene to remove the unreacted macromonomer. The extractables contained no macromonomer indicating all the macromonomer was incorporated in the copolymer. The toluene was decanted from the copolymer and the powdery, colorless copolymer was washed with additional methanol to remove catalyst residues. The copolymer was stabilized with 0.25% Irganox 1010 and vacuum dried to constant weight. The yield of copolymer was 42 g (84.6% conversion).

9b) Copolymerization of 1-Octene with 7-Octenyldimethylsilylpolystyrene (Macromonomer 7a)

The procedure for Example 9a was repeated except that 95 g of 1-octene and 5 g of macromonomer 7a were used to prepare the copolymer. The molar ratio of Al to Ti was 2.5 to 1. The copolymer was obtained in 63% yield. FIG. 1 shows phase segregated domains 10 due to polystyryl grafted groups in the copolymer.

9c) Copolymerization of 1-Octene with 7-Octenyldimethylsilyl Poly[(4-vinylphenyl)dimethyl 2-Propoxysilane (Macromonomer 12)

The procedure for Example 9a was repeated except that 9 g of 1-octene and 1 g of macromonomer 12 were used to prepare the copolymer. The molar ratio of Al to Ti was 4 to 1. The copolymer was obtained in 5% yield.

9d) Copolymerization of 1-Decene with 7-Octenyldimethylsilylpolystyrene (Macromonomer 7a)

The procedure for Example 9a was repeated except that 95 g of 1-decene and 5 g of macromonomer 7a were used to prepare the copolymer. The molar ratio of Al to Ti was 2.5 to 1. The copolymer was obtained in 55% yield.

9e) Copolymerization of Tetradecene with 7-Octenyldimethylsilylpolystyrene (Macromonomer 7a)

The procedure for Example 9a was repeated except that 22.5 g of 1-tetradecene and 2.5 g of macromonomer 7a were used to prepare the copolymer. The molar ratio of Al to Ti was 2.5 to 1. The copolymer was obtained in 45% yield. DSC analysis showed two distinct Tg values. The first due to poly(1-tetradecene) (-33° C.) and the second due to macromonomer (+95° C.).

9f) Copolymerization of 1-Octadecene and 7-Octenyldimethylsilylpolystyrene (Macromonomer 7a)

The procedure for Example 7 was repeated except that 22.5 g of 1 octadecene and 2.5 g of macromonomer (Macromonomer 7a) were used to prepare the copolymer. The molar ratio of Al to Ti was 2.5 to 1. The copolymer was obtained in 48% yield.

EXAMPLE 5

Graft Copolymerization of Method II Macromonomers with Alpha Olefins

Copolymerization of 1-Octene with 3-Butenylpolystyrene (Macromonomer 20a)

Figure 3:
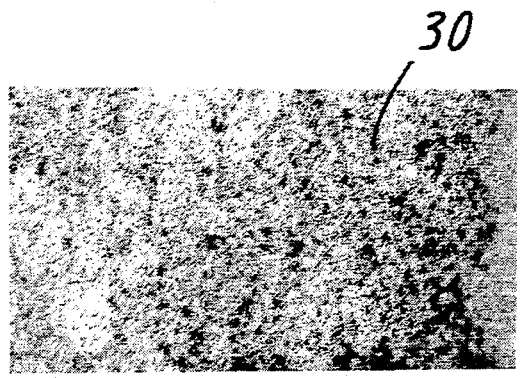

The following reactants were charged to reactor in the following order:

100 g of dry toluene, 95 g of 1-octene, 5 g 3-butenylpolystyrene (macromonomer 20a), and 0.1 g of AA-TiCl$_3$ catalyst. The copolymerization was initiated by slow addition of 1.19 mL of 1.8 M diethylaluminum chloride. The reaction was maintained at 25° C. for 18 hours. The catalyst was deactivated by small amount of methanol. The polymer was obtained in 66% yield. The resulting polymer was isolated by precipitation in excess methanol, and it had an inherent viscosity of 5.7 dl/g in hexane solution at 25° C. FIG. 3 shows phase segregated domains 30 due to polystyryl grafted groups in the copolymer.

Various modifications and alterations of this invention will become apparent to those skilled in the art without departing from the scope and spirit of this invention, and it should be understood that this invention is not to be unduly limited to the illustrative embodiments set forth herein.

I claim:

1. A graft copolymer comprising units having the formula

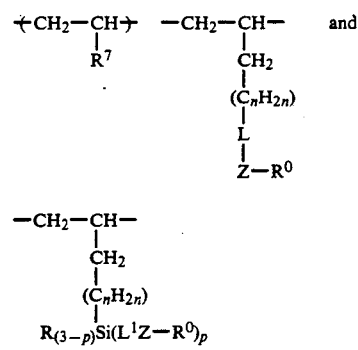

wherein
R$^8$ is a saturated or unsaturated, linear hydrocarbyl group having 2 to 20 carbon atoms, a branched hydrocarbyl group having 3 to 20 carbon atoms, or a cyclic hydrocarbyl group having 5 to 20 carbon atoms;

n is an integer having a value from 0 to 16;

p is an integer having a value of 1, 2, or 3;

R is independently a monovalent hydrocarbyl group which is selected from alkyl groups having from 1 to 18 carbon atoms, aryl groups having from 6 to 10 carbon atoms, and cyclic hydrocarbyl groups having from 5 to 10 carbon atoms;

L is a vidalent linking group selected from the group consisting of

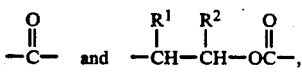

in which each $R^1$ and $R^2$ is independently hydrogen, a $C_1$ to $C_4$ alkyl group, phenyl group, or both of $R^1$ and $R^2$ together with the carbon atoms to which they are attached form a ring having 5 or 6 carbon atoms;

$L^1$ is a covalent bond or a divalent linking group

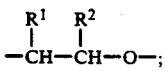

ZX is a divalent polymeric group derived from either or both of polymerizable ethenylarene and conjugated diene monomers;

and $R^7$ is hydrogen or an alkyl group having 1 to 16 carbon atoms.

2. The graft copolymer according to claim 1 wherein said copolymer has at least one the formulae

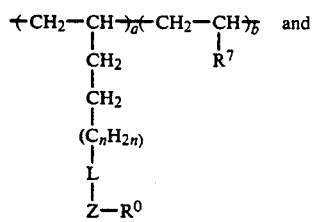

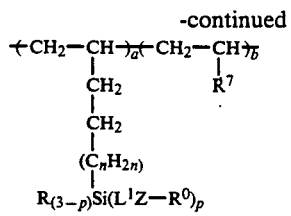

wherein a and b are numbers providing a number average molecular weight of 50,000 to 10,000,000 to the graft copolymer and a having a value that is 0.1 to 25 percent of (a+b), and L, $L^1$, Z, $R^0$, $R^7$, $R^7$, n and p are as previously defined.

3. The copolymer according to claim 2 containing units derived from 1-octene and 7-octenyldimethylsilylpolystyrene.

4. The copolymer according to claim 2 which is a structural plastic.

5. The copolymer according to claim 2 which is a heat activated structural adhesive.

6. The copolymer according to claim 2 which is a low adhesion coating.

7. A chromatographic article comprising a support bearing thereon a layer of a macromonomer having one of the formulae:

$$H_2C=CHCH_2CH_2C_nH_{2n}-Z-H,$$

$$R^0-Z-L-C_nH_{2n}-CH_2CH_2-CH=CH_2,$$

$$(R^0-Z-L^1)_pR_{(3-p)}Si-C_nH_{2n}CH_2CH_2-CH=CH_2$$

wherein $R^0$, Z, L, $L^1$, n, p, and Z are as previously defined.

8. The article according to claim 7 wherein said support is a polymer, ceramic, or glass.

9. The article according to claim 7 wherein said support is a bead, bubble, or fiber.

* * * * *